(12) United States Patent
Mutimear

(10) Patent No.: US 8,678,825 B2
(45) Date of Patent: Mar. 25, 2014

(54) DISPLAY DEVICE

(76) Inventor: Paul Mutimear, New York, NY (US)

( * ) Notice: Subject to any disclaimer, the term of this patent is extended or adjusted under 35 U.S.C. 154(b) by 167 days.

(21) Appl. No.: 13/139,491

(22) PCT Filed: Dec. 10, 2009

(86) PCT No.: PCT/US2009/067521
§ 371 (c)(1),
(2), (4) Date: Aug. 30, 2011

(87) PCT Pub. No.: WO2010/068771
PCT Pub. Date: Jun. 17, 2010

(65) Prior Publication Data
US 2011/0306021 A1    Dec. 15, 2011

Related U.S. Application Data

(60) Provisional application No. 61/122,060, filed on Dec. 12, 2008.

(51) Int. Cl.
*G09B 25/00* (2006.01)

(52) U.S. Cl.
USPC .......................................................... 434/79

(58) Field of Classification Search
USPC ........... 434/72, 74, 75, 76, 78, 79, 81, 96, 98, 434/365, 368, 370, 402, 404, 405
See application file for complete search history.

(56) References Cited

U.S. PATENT DOCUMENTS

| | | | | |
|---|---|---|---|---|
| 1,202,586 A * | 10/1916 | Fairbanks | ....................... | 40/495 |
| 1,246,076 A * | 11/1917 | Fairbanks | ....................... | 434/79 |
| 2,294,131 A * | 8/1942 | Raymond | ....................... | 434/79 |
| 2,300,360 A * | 10/1942 | Remmers | ....................... | 434/79 |
| 2,319,200 A * | 5/1943 | Bedell | ....................... | 434/79 |
| 2,481,672 A * | 9/1949 | Kanaske | ....................... | 434/79 |
| 3,277,591 A * | 10/1966 | Rutkofsky | ....................... | 434/78 |
| 4,330,951 A * | 5/1982 | Hauer | ....................... | 40/124.2 |
| 5,368,485 A * | 11/1994 | Phillips | ....................... | 434/75 |
| 5,601,431 A * | 2/1997 | Howard | ....................... | 434/79 |
| 5,803,739 A * | 9/1998 | Hitchcock | ....................... | 434/78 |
| 6,524,107 B1 * | 2/2003 | Brown | ....................... | 434/72 |
| 2005/0102918 A1* | 5/2005 | Richardson et al. | ........... | 52/79.1 |
| 2008/0204551 A1* | 8/2008 | O'Connell et al. | ............. | 348/79 |

OTHER PUBLICATIONS

International Search Report and Written Opinion, International Application No. PCT/US2009/067521 date Feb. 25, 2010.

* cited by examiner

*Primary Examiner* — Kurt Fernstrom
(74) *Attorney, Agent, or Firm* — Knobbe, Martens, Olson & Bear, LLP

(57) ABSTRACT

The present disclosure is generally related to the device for displaying samples, which may comprise a first display panel, a lens set apart from the first display panel such that a viewer looking through the lens can obtain a focused image of the first display panel, a first opening in or on the display panel for a first generally planar color sample, said first color sample providing a background color, and a second opening for a second generally planar color sample, a second opening for a second generally planer color sample, said second opening configured to overlay said second color sample on a portion of the first color sample. A viewer can use the foregoing device to simulate the display of certain colors or floor materials for a space. Moreover, the viewer can select a desired color and/or floor material for the actual application to the space.

37 Claims, 11 Drawing Sheets

DISPLAY DEVICE

BACKGROUND OF THE INVENTION

1. Field of the Invention

The invention is generally related to a display device for paint samples and a method of using the same.

2. Description of the Related Art

Sample paint chips or paint strips provided by paint manufacturers with colors corresponding to actual colors of paints have been widely used in paint or hardware stores to help customers to visualize the actual colors of paints. However, visualizing how a particular color of paint may look on a wall or visualizing how different colors may look along with each other (such as color of a painted wall with color of a door) is difficult when using paint chips in the stores. There have been light projection devices and computer software that allow a user to visualize a color of paint that the user wants to apply in a place. However, it is difficult to accurately represent paint colors with devices relying on projection of light onto a surface and computer based systems. These all suffer from inaccuracies in color due to numerous variables such as monitor (projection) and printer calibrations. There can be fundamental differences in appearance of transmitted light from a monitor or projection device compared to reflected light from a painted surface. In addition, how the color of paint is perceived can depend on the ambient light and other colors present in a room or area.

SUMMARY OF THE INVENTION

One aspect of the present disclosure is related to a device for displaying samples comprising: a first display panel, a viewing opening set apart from the first display panel such that a viewer looking through the viewing opening can view an image of the first display panel, a first opening in or on the display panel for a first generally planar color sample, said first color sample providing a background color, and a substantially open or transparent surface such that light can enter the device through said surface. The foregoing device may further comprise a second opening for a second generally planer color sample, said second opening configured to overlay said second color sample on a portion of the first color sample. In one embodiment, the first color sample may be configured to be inserted into the first opening and placed on or in the first display panel and possibly comprises a plurality of colors. In another embodiment, the device may be configured to continuously display the plurality of colors present in the first color sample.

In another aspect, the first opening in the device may be placed on the first display panel so that the first color sample is positioned on the display panel. In one embodiment, the viewing opening of the device may comprise a lens adapted to provide a focused image of the first display panel to the viewer. This lens, in some embodiments, can be configured to be adjusted from the first display panel in distance so that the viewer can obtain a focused image of the first display panel. In another embodiment, the lens may comprise a portion of magnifying lens and further the lens can be replaced with another lens.

In still another aspect of the disclosure, the second color sample of the foregoing device may be inserted into a first cartridge and the first cartridge may be configured to be inserted into the second opening. In some embodiments, the first cartridge may comprise a cassette and the second color sample may be inserted into the cassette through a slit present in the cassette, which can possibly be substantially transparent. In some other embodiments, the cassette may comprise an illustration of an object, said object representing a mock-up feature of a space and further the cassette may be configured to be replaced with another cassette from the first cartridge. In still some other embodiments, the foregoing device may further comprise a plurality of openings and thus additional color samples or cartridges can be configured to be inserted into said plurality of openings. Alternatively the device may further comprise a second display panel for displaying a floor material sample, a mirror and/or a light source, said light source being configured to be present in or on the device permanently or temporarily.

The present disclosure also provides a method of simulating a display in a space, wherein the method comprises: inserting the first color sample into the first opening of the foregoing device, providing light to the device, and visualizing a color display image comprising the first second color sample through the viewing opening of the device. In some embodiments, the method may further comprise inserting a second color sample into a second opening of the device, and visualizing a color display image comprising the first and second color samples through the viewing opening of the device. In some other embodiments, the color display may be visualized through a lens present on the viewing opening, said lens adapted to provide a focused image of the first display panel to the viewer.

According to some aspects of the disclosure, the foregoing method may further comprise overlaying the second color sample to a portion of the first color sample. In some embodiments, the second color sample may be inserted into a first cartridge and the first cartridge may be configured to overlay the second color sample to a portion of the first color sample. Further in some other embodiments, the first cartridge may comprise an illustration of an object, said object representing a mock-up feature of a space. In still some other embodiments, the first color sample used in the foregoing method may be configured to represent a background color and the second color sample may be configured to represent the color of said object.

According to some other aspects, the foregoing method may further comprise displaying a floor material on a second display panel of the device. In one embodiment, said visualizing in the method may further comprise bringing the color display image into focus by adjusting the distance of the viewing opening to the first display panel, and looking at a focused image of the color display image through the viewing opening. In another embodiment, the light used in the method may be ambient light of the space. In other embodiments, the method may further comprise displaying additional color sample(s) and/or additional floor material sample(s) in the device. Alternatively, the method may further comprise removing the first or second color sample from the device, and inserting a third color sample into the first or second opening of the device.

The present disclosure may also provide a method of determining a color or a floor material for a space, the method comprising simulating a first color display comprising the first color sample and the second color sample according to the foregoing method of simulating, simulating a second color display, and selecting a proper color for the space. In one embodiment, said simulating the second color display in the foregoing method of determining may further comprise changing the first color sample with a third color sample, and visualizing the second color display image comprising the second and third color samples through the viewing opening of the device. In another embodiment, said simulating the second color display may further comprise changing the second color sample with a third color sample, and visualizing the second color display image comprising the first and third color samples through the viewing opening of the device. In still another embodiment, the foregoing method of determining may further comprise displaying a first floor material in the device, and simulating the first color display or the second color display with the first floor material. In still another embodiment, the foregoing method of determining may further comprise changing the first floor material sample with a second floor material sample, and selecting a proper floor material for the space.

BRIEF DESCRIPTION OF THE DRAWINGS

FIGS. 1A and 1B show perspective views of the device in two different directions.

Figure 1A:
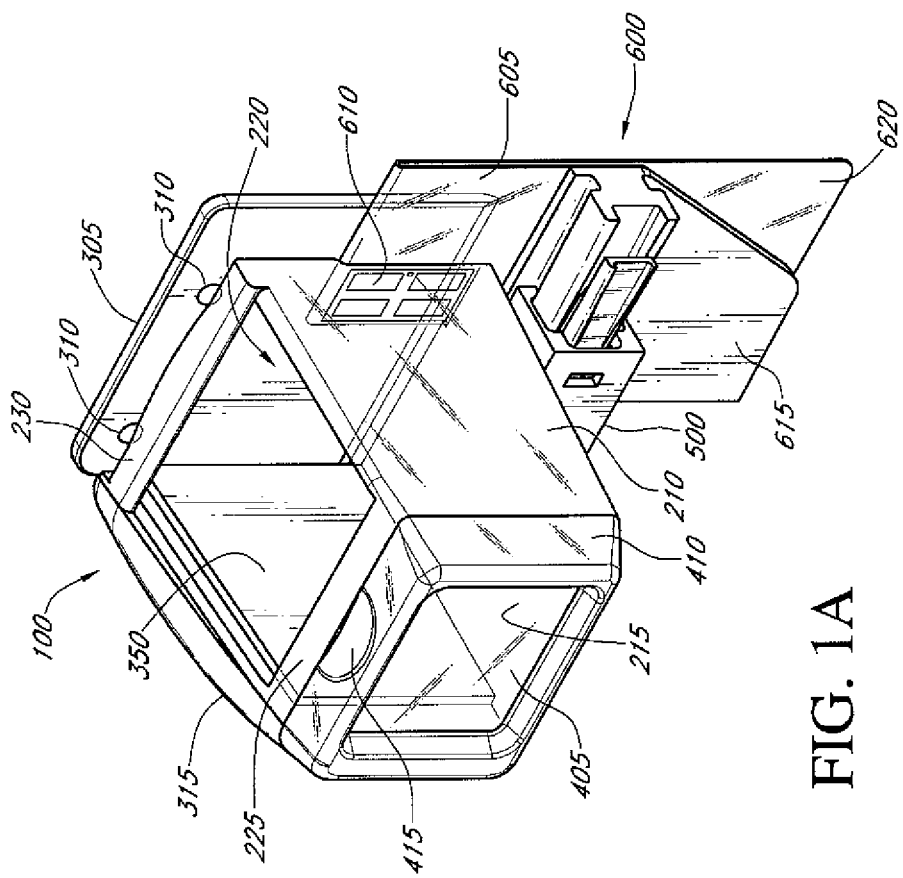
FIGS. 1A and 1B show a non-limiting, illustrative example of a display device according to some embodiments of the invention.

<Reference numerals for designating main components in the drawings>

| | |
|---|---|
| 100: | Display compartment |
| 200: | Main frame |
| 205: | First side wall |
| 210: | Second side wall |
| 215: | Floor |
| 220: | Window |
| 225: | Front beam |
| 230: | Rear beam |
| 213: | Protruded center portion |
| 235: | Serrated guide rail |
| 240: | Protrusions |
| 241: | Pits |
| 242: | Bumps |
| 245: | Boss |
| 246: | Screw holes |
| 250: | Rib |
| 255: | Side bar |
| 260: | Color cartridge receiver holder |
| 265: | Rim |
| 270: | First opening |
| 300: | Corner frame |
| 305: | First display panel |
| 310: | Stoppers |
| 315: | Cover |
| 320: | Screw holes |
| 325: | Upper portion |
| 330: | Lower portion |
| 335: | Screws |
| 340: | Boss |
| 341: | Holes |
| 345: | Grooves |
| 350: | Mirror |
| 360 | Second opening |
| 370: | Third opening |

-continued

<Reference numerals for designating main components in the drawings>

| | |
|---|---|
| 400: | Vision frame |
| 405: | Lens |
| 410: | Lens frame |
| 415: | Recess |
| 420: | Side bar |
| 425: | Stoppers |
| 430: | Guide hole |
| 500: | Color cartridge receiver |
| 505: | Tab |
| 510: | Protruding tip |
| 515: | Guide bar |
| 520: | Guide grooves |
| 525: | Tip holder |
| 530: | Receiving groove |
| 535: | Wall |
| 600: | Color cartridge |
| 605: | Cassette |
| 606: | Front cassette layer |
| 607: | Rear cassette layer |
| 608: | Cassette edges |
| 610: | Display window |
| 615: | Front base layer |
| 620: | Rear base layer |
| 625: | Slit |
| 630: | Guide grooves |
| 632: | Guide bars |
| 635: | Tab |
| 640: | Protruding tip |
| 645: | Release bar |
| 650: | Release groove |
| 700: | First color sample |
| 800: | Second color sample |

DETAILED DESCRIPTION OF THE PREFERRED EMBODIMENT

The present invention was developed to provide a device which can be used at any site, including a room which is to be painted, and enable the user to accurately visualize how the colors of the paints will look in situ. Some embodiments of a color visualizing device disclosed in the present disclosure provide a portable device that can be used in an actual place to be painted, hence giving a truer representation of the paint color in ambient light of the actual place. This device, according to some other embodiments, can display additional materials, such as a floor material.

The present disclosure is generally related to a device for simulating color display in a space. In one aspect of the invention, the color display device is configured to allow a user or viewer of the device, such as a contractor, an interior designer, general public or any one who is willing to simulate color display in a space, to view at least one color sample (e.g. paint color chip or paint color strip) through a magnifying lens. More specifically, the device is configured to allow the user to preview arrangement of at least one, preferably two or more, color samples through the magnifying lens. Inside the device can be configured as a representation of a space or a place. The device can allow the user to visualize how a space may look with painted walls having the same color as the color on the color sample, e.g. paint strip.

In another aspect of the disclosure, the foregoing device can also be used to display a floor material in a space along with color display. In one embodiment, a variety of floor materials, which can be selected from any materials available in the market, can be displayed in the device. Some non-limiting examples of such floor materials would be a vinyl, a laminate floor material, a carpet, a wood, a tile, a stone, a rubber, a paper, and any combinations thereof. Further, when the device of color display is used to simulate the color display of the exterior space, the floor can be replaced with any material representing ground, e.g. soil, grass, stone, brick, and others. Therefore, the user of the device can preview an image of an actual space with various arrangements of the displayed materials representing floor or ground along with colors.

The space or place in most of the embodiments includes, but is not limited to, any space present in a residential, commercial, or public building. For example, a bed room, a bath room, a living room, a kitchen, a family room, a garage, a game room, an entertainment room, a nursery room, a basement, a storage or any other rooms/space that can be present in a house would be included. Also an office, a conference room, a reception and others in a general office building; a class room and others in general school buildings; a ward, an examination room and others in general hospital buildings are included in some embodiments. Further, in some other embodiments, a user desiring to change a color(s) in open space such as parks as well as an exterior portion of a building can also use the device and the color-display simulating method in this disclosure. Accordingly, use of the device of simulating color display in the present disclosure would not be limited to any specific type of space but can be extended to all types of space comprising a colored portion. In addition, proper modification to the device can be further provided to serve a certain type of the space if desired, without departing from the spirit or scope of the subject matter presented here.

According to some embodiments, at least one feature of a space can be represented by a mock-up feature having various colors inside the device. This can allow the user to preview how an actual space may look with various color (e.g. paint color) arrangements before applying the color in the actual space. The feature may be any object that can be present in a space. Some non-limiting examples of the feature may include, but not limited to, a door, a window, a stair, a sink, a piece of furniture (e.g. a chair, a sofa, a table, a bed, and others), any appliance (e.g. a refrigerator, a television, and others), any decorative objects (e.g. a light, a picture frame, a plant, a curtain, a window blind, and others), and even a piece of cloth (if the color match with background and clothing is desired, for example). Such features can further include any object present in an open space or an exterior of a building, if the color display device is desired to be used for such space. Therefore, in such cases, the feature displayed in the device may comprise a plant, a sculpture, a fountain, a building/ house, a car or any other objects that the viewer or user is willing to simulate in the device. The feature presented in the device can serve the double function of providing an element of realism to the space and also allowing the introduction of a secondary color for color coordination purposes.

Moreover, according to some embodiments, portability of the device can enable the device to be used in the actual space or location to be painted, hence giving a representation of the paint color in the ambient light of the actual, desired space without distraction from extraneous existing color elements. Alternatively, any other types of natural or artificial light can also be used with the device upon the viewer's desire. In further alternative embodiments, a light source may be configured to be present in or on the device. For example, a light source such as a lamp can be installed in the device and controlled by the viewer. This light source may be permanently or temporarily present in the device and further, in some other embodiments, the location of the light source may be varied within the device if wanted. In another example, the light source may be present outside of the device and bring the light to the device if necessary. In such example, the light source may be present outside the device but connected to the device. In more specific examples, the bendable light source may be installed on the outside of the first display panel (or anywhere on the outer surface of the device) and the light emission can be directed to the device if necessary. Further the device may be configured to associate with such light source when needed, via for example a connector connecting the light source and the device. As such, provision of light to the device can be done in a variety of ways including those described above and all of such various ways are included in the scope of the invention.

The present disclosure further provides a method of simulating color and/or floor material display in a space. According to some embodiments, the method comprises: displaying one or more color samples into the foregoing device. According to some other embodiments, a variety of floor materials can also be displayed in the device along with the color samples. With such embodiments disclosed in the present application, the user of the device can visualize the image of a space with various color samples and floor materials before actual application to the space. Moreover, after simulating various color and/or floor displays according to the foregoing method, the user can determine a color and/or a floor material for actual application to the space.

In some aspects of the present disclosure, the device for displaying color samples generally comprises a first display panel, a lens set apart from the first display panel such that a viewer looking through the lens can obtain a focused image of the first display panel, a first opening in or on the display panel for a first generally planar color sample, said first color sample providing a background color, and a second opening for a second generally planar color sample, said second opening configured to overlay said second color sample on a portion of the first color sample.

In the foregoing device, the first display panel can generally be considered as a background of a space. Depending on the type of space, the first display wall can represent, for example, a background wall (of a room or office), an external wall of a building, or even a generally open space, if the space comprises an open area. The first color sample is generally displayed on or in the first display panel and thus it can provide a background color of a space. The first color sample may comprise a plurality of colors and therefore multiple colors can be continuously displayed on or in the first display panel. If the viewer is willing to display colors in other color samples, the first color sample can be replaced with other samples easily and it can further demonstrate various colors.

The lens present in the device is generally placed apart from the first display panel. In some embodiments, the lens can be a magnifying lens and thus the simulating color display image in the device can be further exploded when viewed. Depending on the viewer's eyesight, the lens can be changed with different magnification powers. In addition, the position of the lens can be adjusted, i.e. the distance between the lens and the first display panel can be varied, to provide a focused image of the color display image. With this adjustment configuration, many viewers, some of which have different focal lengths, can use the same device and obtain an individually focused color display image by properly adjusting the lens position. Further, the same color display image can also be viewed via differently positioned lens in order to provide far as well as near views of the display. When the device is not in use, the lens can be in a closed position as seen in FIG. 1A.

The device can further comprise a second color sample. Like the first color sample, the second color sample can comprise a plurality of colors and display these colors continuously in the device. Alternatively, the color samples used in the device may comprise a single color in each sample. In general, this second color sample can represent a color of a feature of a space (i.e. a mock-up feature) and be displayed with the first color sample. In general, the viewer can select any feature that he or she wants to display in the device. For example, if the viewer wishes to coordinate the color of the room wall with a sofa, the viewer can display a mock-up feature of sofa with the second color sample in the device where the first color sample is displayed as a wall color. Depending on the viewer's desire, the sofa feature with the second color sample can be displayed anywhere in the device, e.g. center, right or left side, front or back of the device. Also, if wanted, more than one mock-up feature along with a plurality of color samples can be displayed in the device. For instance, if the viewer wants to simulate a color display in a space where a window, a sofa, and a stair are included, the viewer can apply three separate color samples, each of which represents a color for the window, sofa, and stair respectively, in the device along with the first wall color sample. As such, the viewer can simulate a variety of color display options for a space by using the device of the present disclosure. While only few exemplary applications are described herein for the purpose of illustration, many different modifications and alternations, which should be obvious to a person with ordinary skill in the art, can also be done without affecting the scope of the invention. Therefore, not only the examples disclosed in this application but also such modifications and alterations should also be included in the scope of the invention.

In one aspect, the device can display at least two color samples and simulate a variety of the color display combinations. As explained above, the first color sample and the second color sample can provide more than one color and thus the possible color combinations simulated in the device can be very many. In addition, the device can further comprise more color samples simultaneously. For example, the viewer may be willing to test a first color sample for one wall of a room; a second color sample for a sofa, and a third color sample for another wall of a room. In such case, three different color samples can be displayed together in the device to simulate the color display in need. Therefore, if desired, multiple color samples, more than two, can be displayed in the device together.

Another aspect of the invention, however, also includes a device displaying one color sample. For example, if the viewer is willing to simulate a variety of background color of a space without coordinating any feature in the space, the viewer can display only a first color sample in the device and visualizes the image via the lens. Alternatively, if the viewer wants to test a variety of colors for a room feature (e.g. sofa) with already-determined room wall color, the viewer can provide a second color sample into the device that already displays said room wall color in the first display panel. In this particular example, the viewer would try a variety of second color samples to determine a desired color for his or her sofa. As such, the device according to the present disclosure can be used for displaying a single or multiple colors without any limitation. Also described elsewhere in this specification, the device can be used to simulate a variety of floor or ground materials if desired.

While there are various ways of displaying the color samples in the device, one exemplary way would be inserting the color sample to the device directly. According to some embodiments, the color samples are in a form of a generally planar sheet and such that they can easily be inserted into the device if the device comprises some openings for such insertion. In some embodiments, the device comprises a first opening in or on the first display panel in order to accommodate the first color sample. Another way of displaying a color sample would be using an additional element such as a color cartridge. In certain embodiments, the second color sample can be displayed in the device via the color cartridge. The second color sample, in one example, can be placed in the color cartridge and the color cartridge may be installed into the device. This color cartridge in at least some embodiments is configured to provide the second color sample to a second opening of the device. With this configuration, the device can display the first and second color samples together. According to some embodiments of the present invention, the second color sample may be displayed in a way that the second color sample is overlaid on a portion of the first color sample.

The foregoing and other features of the present disclosure will become more fully apparent from the following description and appended claims, taken in conjunction with the accompanying drawing. Understanding that the drawing depicts only several embodiments in accordance with the disclosure and is, therefore, not to be considered limiting of its scope, the disclosure will be described with additional specificity and detail through use of the accompanying drawing.

The overall shape of a device for displaying color samples can be any shape. In one embodiment, the device can be shaped generally in a hexahedron or cube comprising six areas. However, the device can be manufactured in a variety of shapes, for example, a cylindrical shape, an octahedron and others. Further, the overall shape of the device can be further modified in a way that reflects the spatial arrangement of a specific space that the viewer wants to simulate the colors for.

Figure 1B:
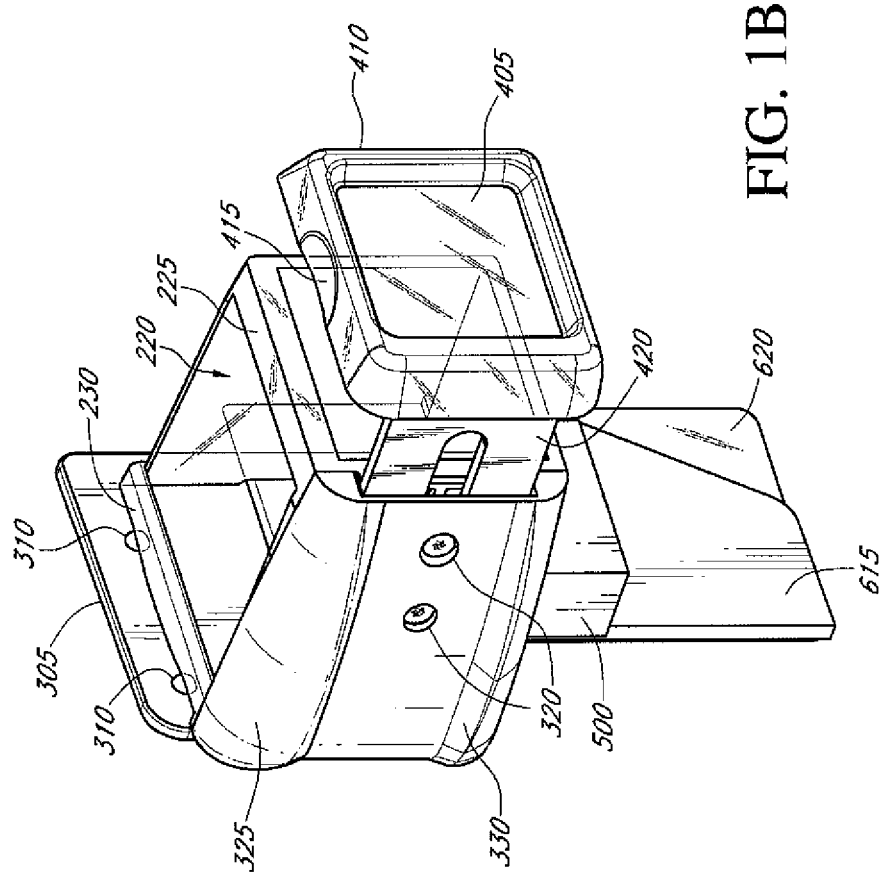

As a non-limiting and illustrative example of some embodiments, a device for displaying color samples is provided in FIGS. 1A and 1B. FIGS. 1A and 1B show a perspective view of the device from right-side and left-side, respectively. According to one aspect of the invention, the device can comprise a display compartment 100, which is generally a rectangular enclosure, i.e. an enclosure in shape of a cube or hexahedron. A variety of color samples can be installed inside the display compartment and each color sample may represent a background color or any feature of a space. The background color is generally displayed on the inner side of the rear wall of the display device, thereby, for example, representing a room wall color. If desired, a second color sample, which can represent any room feature, can be displayed within the device. Among various possible ways of displaying the second or more color samples, the exemplary device in this figure shows a mechanism using a color cartridge 600. The color cartridge 600 can be designed to be temporarily assembled with the display compartment 100 and provide the second or more color samples into the device. In addition to the color display, the device can further comprise a floor material, for example, on the floor 215 portion of the display compartment. According to some embodiments, the display device may comprise an open window 220 on top of the device, in part to bring light into the device. Once the color and/or floor display is set for viewing, the viewer can look at the image through a lens 405. As shown in FIG. 1B, the lens is configured to be positioned differently so that the viewer can obtain a focused image of the color display. The detail structure of the display compartment 100 and the color cartridge 600 is shown in the following FIGS. 2A and 2B.

Figure 2A:
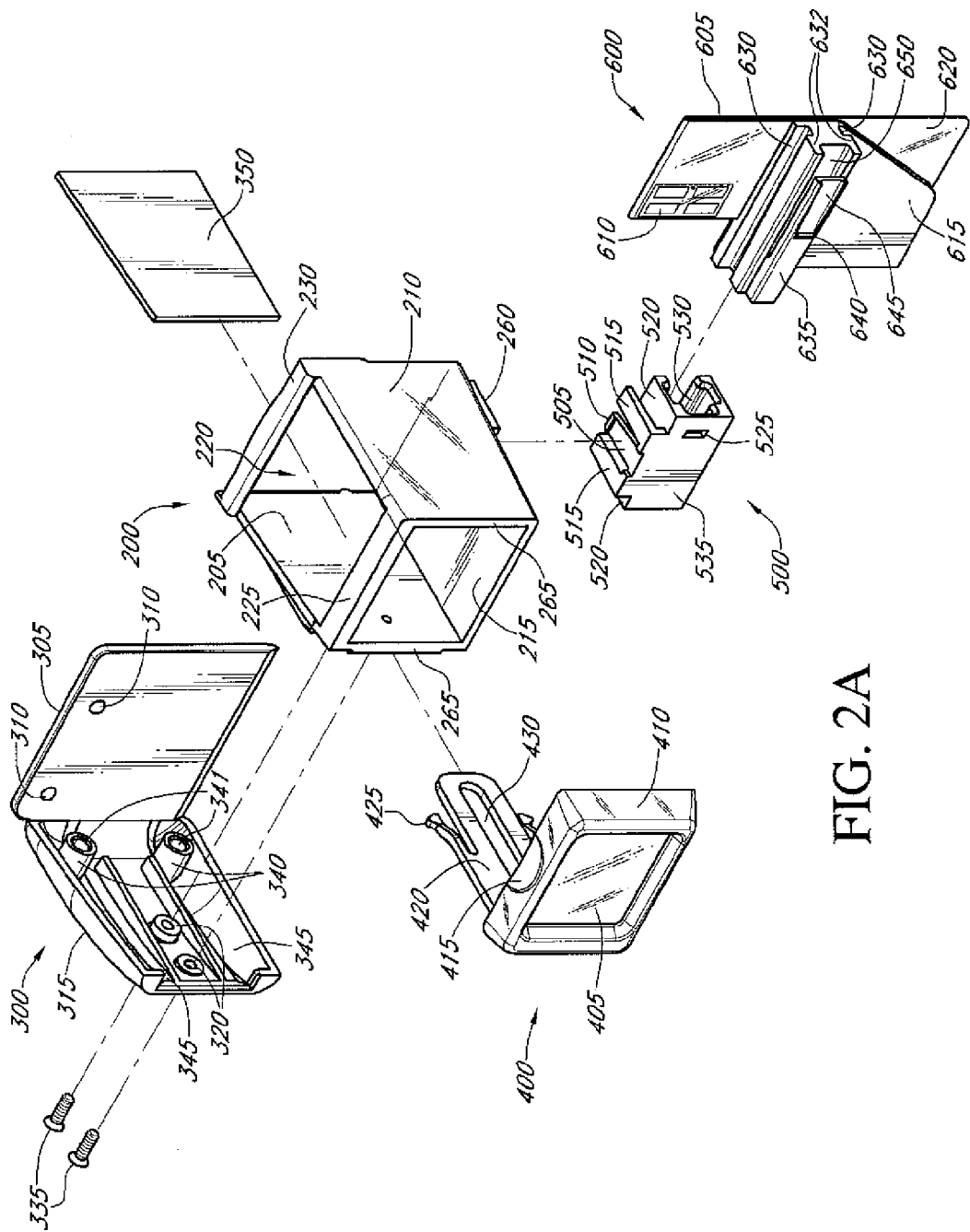
FIGS. 2A and 2B show exploded views of the device shown in FIGS. 1A and 1B in two different directions.
Figure 2B:
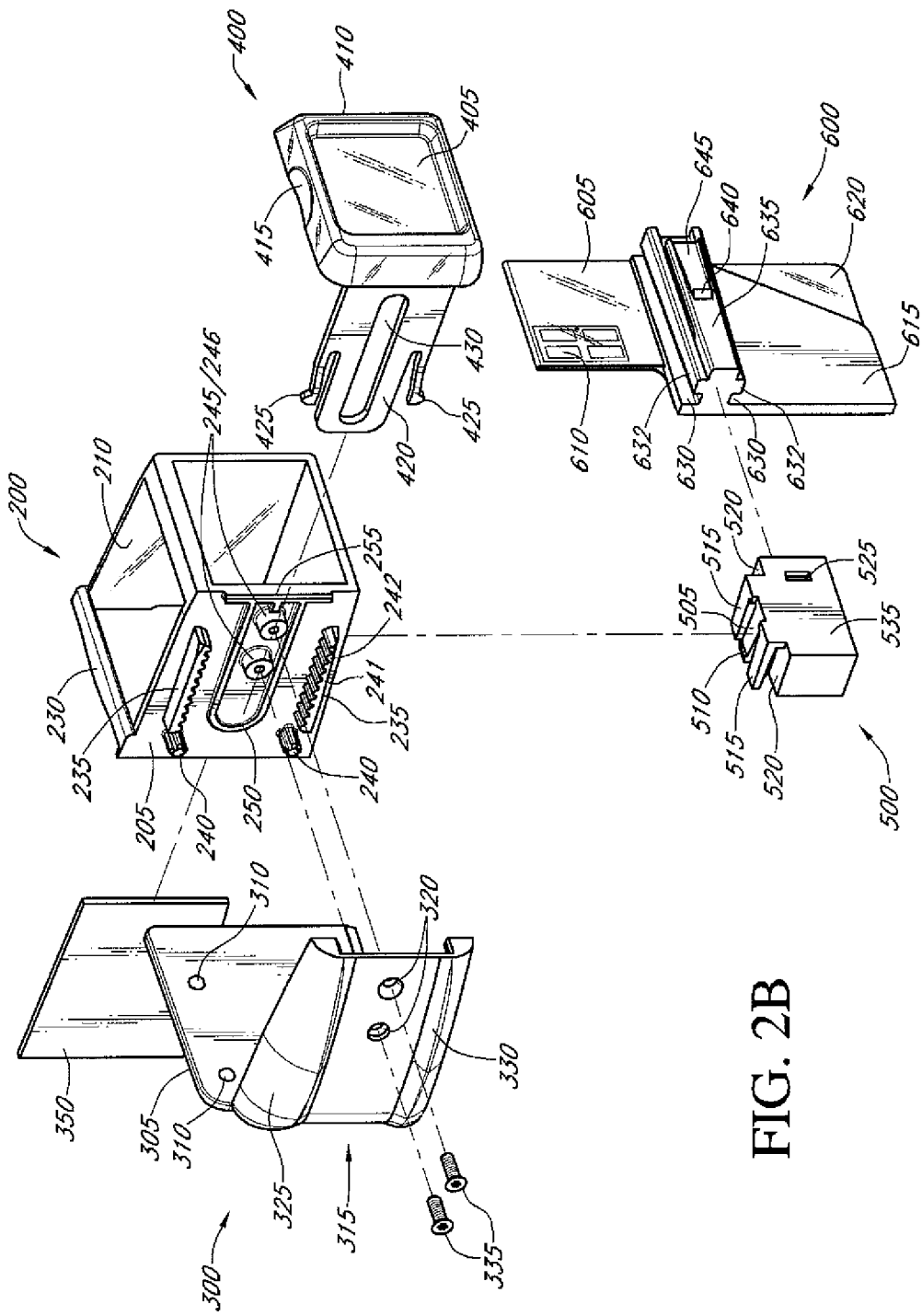

FIGS. 2A and 2B show exploded views of the device for displaying color samples of FIGS. 1A and 1B. The display compartment can be further composed of four parts, which comprise a main frame 200, a corner frame 300, a vision frame 400, and a color cartridge receiver 500. In alternative embodiments, some or all of the four parts may not be present individually but combined with each other. For example, the color cartridge receiver 600 may be permanently associated with the main frame 200. In further alternative embodiments, there would be more parts added to the display compartment 100. For example, the mirror 350 can be further installed in the display compartment, preferably in the inner side of the first side wall 205. In addition, other embodiments may be utilized, and other changes may be made, without departing from the spirit or scope of the subject matter presented here in the general structure of the device.

According to the embodiment shown in FIG. 2A, the main frame 200 comprises a first side wall 205, a second side wall 210, a floor 215, a window 220, a front beam 225, and a rear beam 230. In general, the window 220 is designed to remain open and receives any light provided to the device. For example, an ambient light of a space, any other natural or artificial light can be directed to the device. However, in alternative embodiments where a color or material corresponding to a ceiling of a space is desired to be displayed in the device, this open window 220 may further comprise a closed wall. Then a color sample or any ceiling material can be displayed on this wall to simulate the ceiling color or material display on 220.

In one (outer) side of the first side wall 205, there are a variety of components designed for the assembly of the corner frame 300 and the vision frame 400 with the main frame 200. For the assembly of the corner frame 300 with the main frame 200, there are one or more of protrusions 240 and screw holes 246 in the first side wall 205. The protrusions 240 are configured to be inserted and tightly fixed in the holes 341 present in the inner side of the cover frame 300. To further strengthen the assembly between the main frame 200 and the corner frame 300, one or more screws 335 can be used as shown in this figure. In this presented embodiment, two screws 335 are inserted from the outer side of the corner frame 300 through the screw holes 320 present in the corner frame and further into the screw holes 246 present in the first side wall 205.

The device shown in FIGS. 2A and 2B also comprises the vision frame 400 and this vision frame comprises a lens 405, a lens frame 410, and a side bar 420. The lens 405, which can be in a variety of shape such as a general square, a general circle, or others, can comprise a magnifying portion in some embodiments. The lens frame 410 generally protects the lens and the viewer can hold this frame to reposition the lens. This vision frame can be placed between the corner frame 300 and the first side wall 205. In the outer side of the first side wall 205, there are serrated guide rails 235, which are designed to function cooperatively with the stopper 425 on the side bar of the vision frame 400. As seen in FIG. 2B, the serrated guide rails 235 comprise a repeat of pits 241 and there are bumps 242 between the pits 241. When the stopper 425 is located in one of the pits 241 of the serrated guide rails 235, the lens 405 connected to the stopper 425 via the side bar 420 would be temporarily fixed in one position. If the position of the lens needs to be changed, a user of the device can provide a certain amount of force to the front or rear direction. For this, in at least some embodiments, there would be a recess 415. The recess 415 can be present on the top and bottom sides of the lens frame 410 as shown herein or alternatively on the left and right sides of the lens frame 410. The viewer can hold these recesses with fingers and move the vision frame 400 including the lens 405. With such enforcement, the lens 405 can be further projected to the front direction (i.e. toward the viewer) and thus the distance between the lens and the main frame 200 can be increased. Alternatively, the vision frame 400 can be pushed back to the rear direction, so that the lens 405 is placed more close to the main frame 200. By repeating such back and forth movement of the lens 405, the viewer can find a proper position of the lens 405 at which the viewer can obtain a focused image of the color display. Once a desired position of the lens is determined, this position can be kept steady while the viewer is looking at the image through the lens, via stoppers 425 held by the serrate guide rails 235.

The vision frame 400 is generally placed between the first side wall 205 and the corner frame 300. In one embodiment, the side bar 420 of the vision frame 400 comprises a guide hole 430. This guide hole 430 encompasses the boss with screw holes 245 and 246 present in the first side wall 205; however it is not permanently assembled to any part of the corner frame 300 or the main frame 200. Therefore, with this configuration, the vision frame 400 can be mobilized by sliding to the front and rear directions as marked in arrows (F: front, R: rear). The vision frame 400 can be projected forward (i.e. toward the viewer), however the excess projection that may cause a complete dissociation of the vision frame 400 from the main frame 200 would not be desired. According to the embodiment in this figure, the boss 245 present in the guide hole 430 would prevent the side bar moving too far forward until it becomes detached from the device.

In certain embodiments, the corner frame 300 can comprise a variety of components as shown in FIGS. 2A and 2B. To accommodate the serrate guide rails 130, the corner frame 300, more particularly, a cover 315 would have an upper portion 325 as well as a lower portion 330 each of which is bulged toward the outside. The corner frame 300 also comprises a first display panel 305 and, in some embodiments the first display panel 305 further comprises stopper 310. When the corner frame 300 is assembled with the main frame 200, the first display panel 305 is generally placed in the backside of the main frame 200 as shown in FIGS. 1A and 1B and later figures. The first display panel 305 does not directly contact the backside of the main frame 200 and thus there is generally an opening between the first display panel 305 and the main frame 200. This opening often serves as a first opening 270 where the first color sample is inserted and displayed. The first opening is further exploded in FIG. 3A.

The device for displaying color samples, according to some embodiments, can comprise an additional component such as mirror 350. This mirror can be displayed in the inner side of the first side wall 205. The mirror can reflect the first color sample displayed in or on the first display panel 305 in such a way as to represent another wall of the same color, orthogonal to the first display panel 305.

In some embodiments, said color display device can further comprise a color cartridge for displaying a second or more color samples in the device. In some of such embodiments, the device can comprise a color cartridge receiver 500 that is configured to accommodate and hold the color cartridge. In the embodiment shown in FIGS. 2A and 2B, the color cartridge receiver 500 is designed to be assembled with the main frame 200 when necessary. In such exemplary embodiment, the color cartridge receiver 500 can be placed under the main frame 200 via, for example, a snap-fit mechanism. As shown in FIGS. 2A and 2B, there is a plurality of guide bars 515 as well as guide grooves 520. These guide bars and grooves 515 and 520 can be inserted into a color cartridge receiver holder 260 present under the main frame 200. The color cartridge receiver holder 260 may comprise guide bars and grooves that are complementary to the guide grooves and bars of the cartridge receiver 500, respectively. In such configuration, the color cartridge receiver 500 may slide into the complementary structure of the color cartridge receiver holder 260 and becomes tightly fixed. Such installation of the color cartridge receiver 500, however, would be temporary and therefore dissociation of the receiver 500 from the main frame 200 can also be done by releasing the snap-fit type lock.

The color cartridge would be used to display a second or more color samples. To provide a second color sample via the cartridge to the device, this cartridge may need to be temporarily assembled with the main frame 200. As one embodiment of such assembly, a snap-fit type mechanism is presented in FIGS. 2A and 2B. As shown in FIGS. 2A and 2B, the color cartridge 600 comprises an assembly portion (e.g. 630, 632, 635, 640, and 650) that is complementary to the portion (530) present in the color cartridge receiver 500. This assembly portion of the color cartridge 600 can slide into the receiving groove 530 of the receiver 500 until the protruding tip 640 of the tab 635 is placed in the tip holder 525 of the receiver 500. When the tip 640 tightly fits in the holder 525, this would prevent the color cartridge 600 being further inserted into the receiver 500 unnecessarily and also prevent the cartridge 600 being removed from the main frame 200. If the color cartridge 600 needs to be disassembled from the main frame 200, the release bar 645 can be pushed toward the release groove 650, which results in the release of the tip 640 from the holder 525. While the release bar 645 is pushed, the color cartridge 600 can be slid out from the receiver 500 until the cartridge 600 is completely removed. While a snap-fit type mechanism is described herein as an exemplary embodiment, other mechanisms that are configured to temporarily or permanently associate the color cartridge to the main device are also included according to the present disclosure.

Figure 3A:
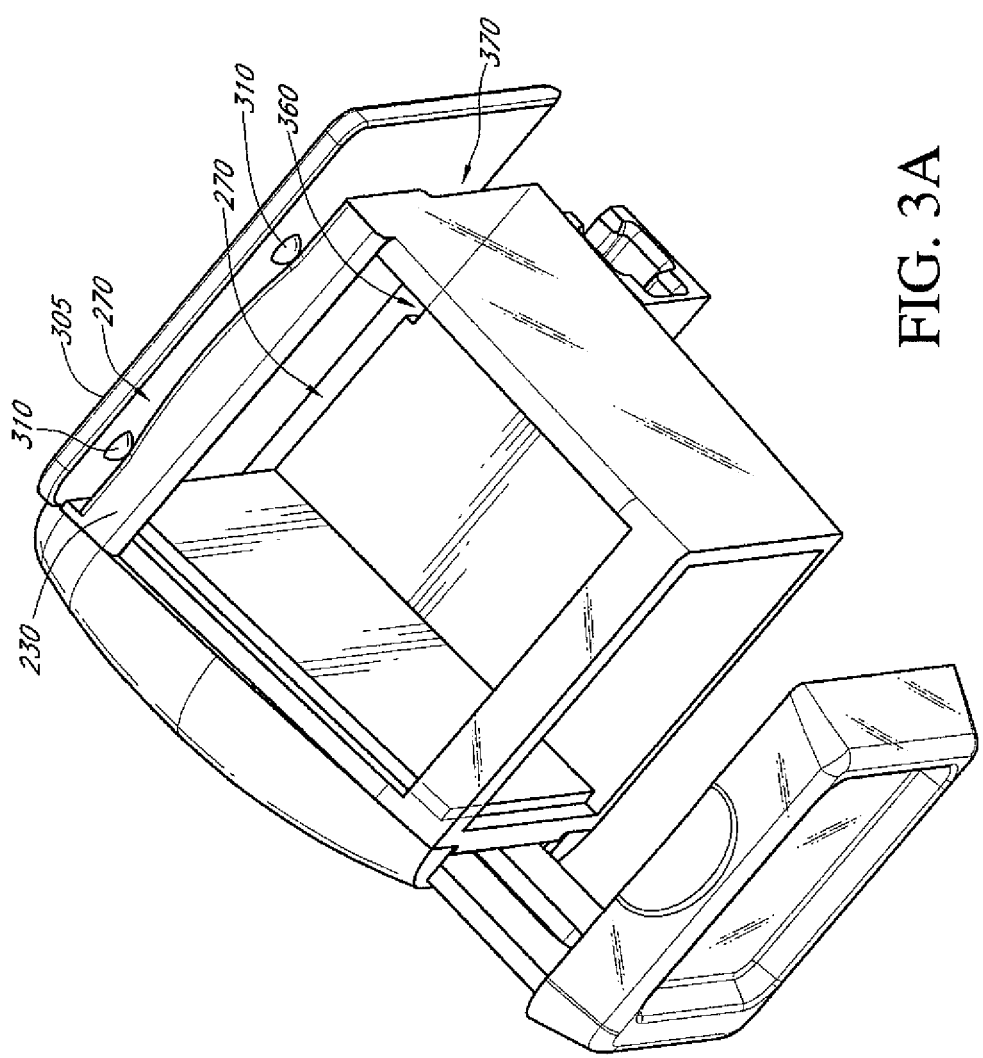
FIGS. 3A and 3B show enlarged views of a main frame of the device shown in FIGS. 1A and 1B.
Figure 3B:
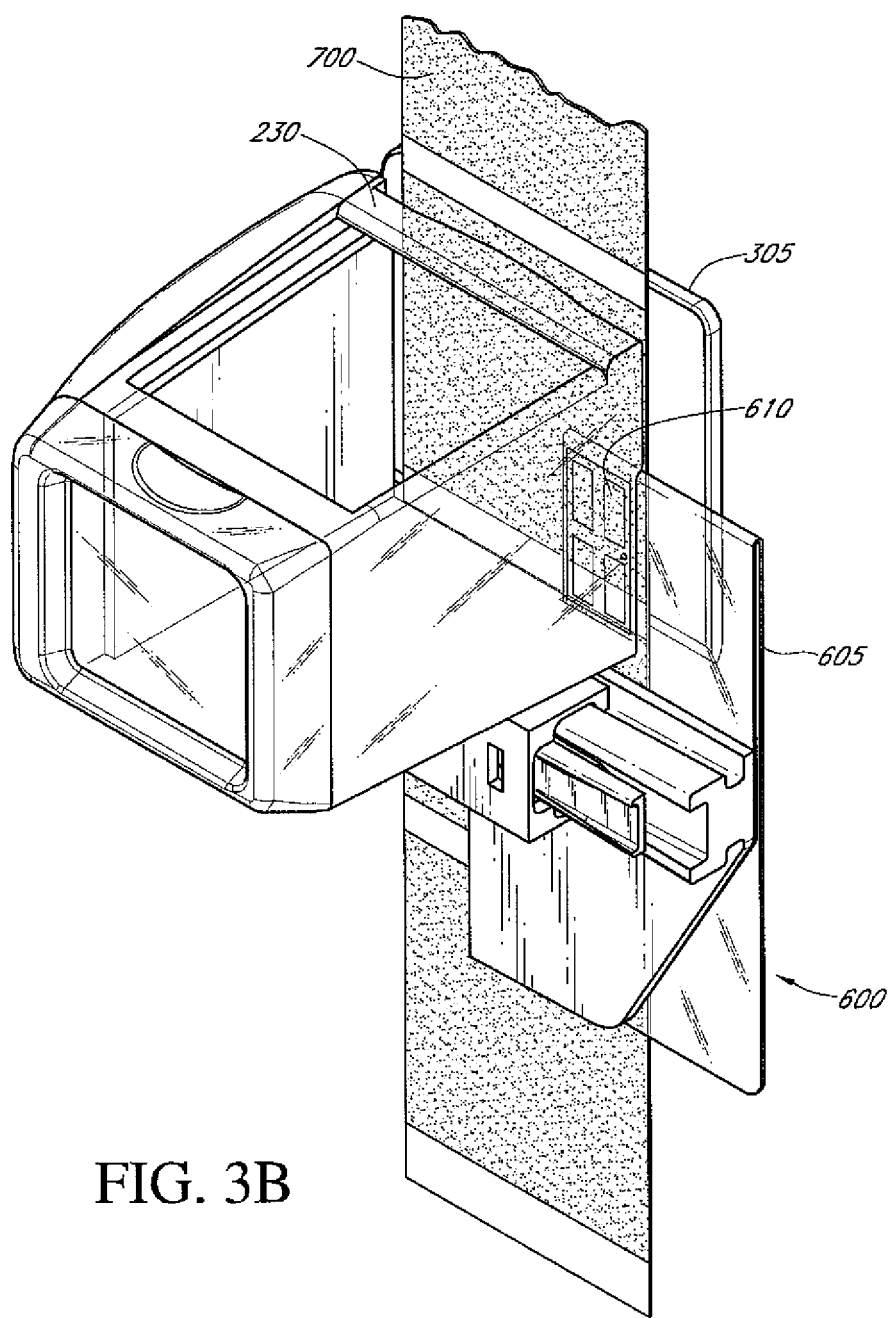

FIGS. 3A and 3B show enlarged views of the main frame 500, in particular, illustrating how a first color sample 700 is displayed in the device. FIG. 3A shows an enlarged view of the display compartment 100. This view shows at least two openings, a first opening 270 and a second opening 360. A first opening 270 is generally placed between the first display panel 305 and the back side of the main frame 200. As shown in FIGS. 2A and 2B, for example, the first display panel 305 is placed close to the back side of the main frame 200 without directly contacting each other. Therefore, there is an open space or opening before the first display panel in this particular embodiment.

As shown in FIG. 3B, the first color sample 700, which may comprise more than one color, can be placed before the first display panel by being inserted into the first opening 270. The color strip 700 can be inserted or slid into the first opening 270 from the bottom of the device (i.e. direction 1) or alternatively from the top of the device (i.e. direction 2). Still alternatively, the color sample 700 can be slid laterally into the device, for example from right to left direction (i.e. direction 3). In any of these embodiments, the color sample can be further moved up and down (i.e. directions 1 and 2) to display a plurality of colors in the device.

In some embodiments, the color display device may further comprise some components to more stably display the first color sample. For example, the first display panel 305 may comprise stoppers 310 and the rear beam 230 of the main frame 200 may have a rounded surface with the center region 231 protruded toward the first display panel 305. With this configuration, both sides of the color sample 700 are pushed toward the rear beam 230 and the center portion of the color sample 700 is pushed toward the first display panel 305 (FIG. 3A). This mechanism can increase the amount of friction as well as pressure to the color sample 700 and therefore the color sample would not be removed (e.g. slipped off) from the device easily. Instead, the color sample would be able to be steady in one position by the foregoing holding mechanism while the color display is being observed. When the viewer wishes to display a different color present in the color sample 700, the viewer can change the colors by providing enough force to overcome the friction applied to the color sample and move the sample up and down (i.e. directions 1 and 2).

Figure 7:
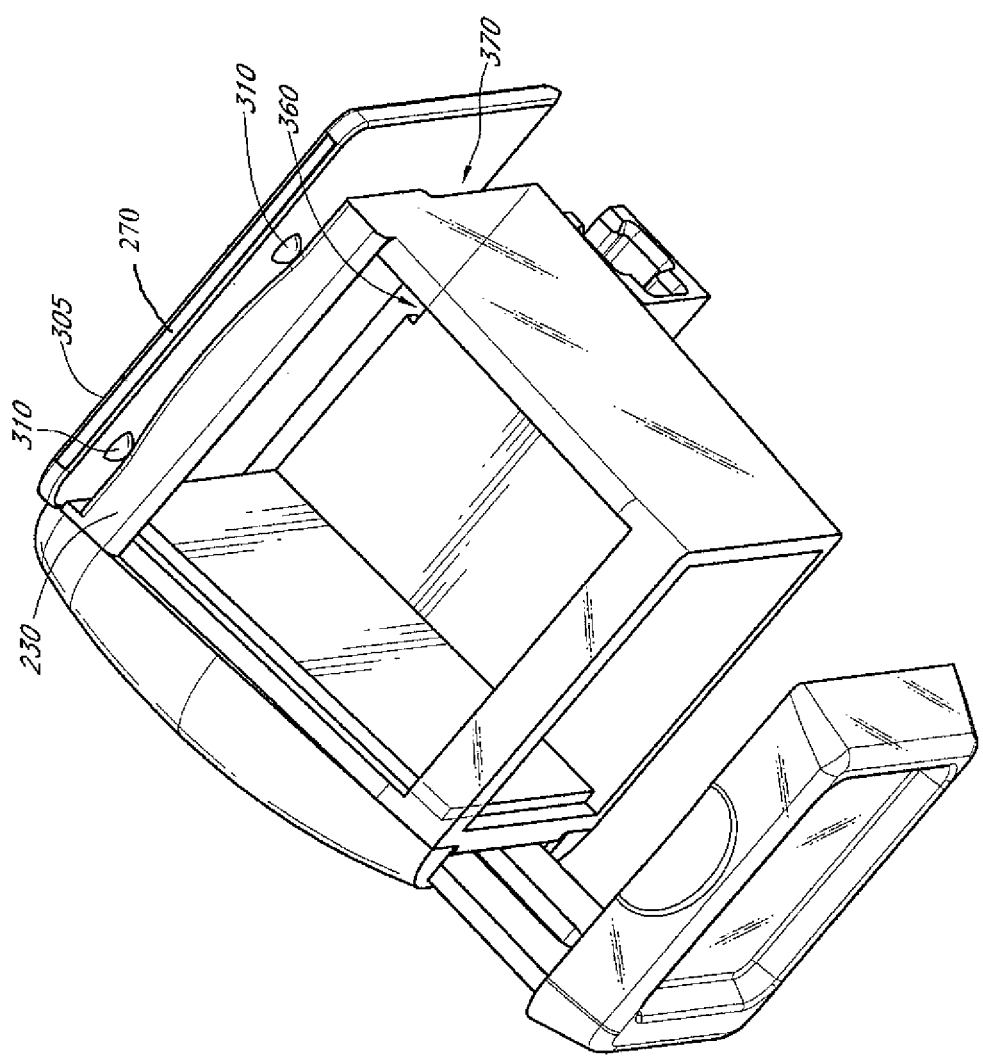
FIG. 7 shows an alternative embodiment comprising a first opening in the first display wall.

There are a variety of alternative embodiments in manufacturing the first opening in the device. For example, the first opening can be placed in the first display panel. This means that the first display panel would comprise an empty space (270 in FIG. 7) therein and thus a color sample can be slid into the inner space. Alternatively, if the first display panel is composed of two sheets and there is a slit between the two sheets, it can also accommodate the color sample within the display panel. In such embodiments where the color sample is displayed in the display panel, the display panel would need to be substantially transparent, thereby the color being displayed through the display panel to the viewer. Additionally, other embodiments may also be utilized, and other changes may be made, without departing from the spirit or scope of the subject matter presented here.

The second opening shown in FIG. 3A is designed generally for a second or more color samples. As described, the second color sample can be displayed via a color cartridge in some embodiments. In such embodiments, the color cartridge 600 is configured to be assembled with the main frame 200 via, for example, a snap-fit mechanism, which is described in detail with FIGS. 2A and 2B. In such example, once the cartridge 600 is properly assembled with the main frame 200, the cassette 605 placed on top of the cartridge 600 would be slid into the device through a second opening 360. In some embodiments, there would be a third opening 370 present in the second side wall 210 to further accommodate the color cartridge 600. When assembled, the color cartridge 600 would provide a portion of the cassette, more specifically, the display window 610, into the main frame 200. In some embodiments, the display window 610 may be placed before the first color sample 700. More particularly, the display window 610 would be displayed in a way that it is overlaid on a portion of the first color sample 700. With this arrangement, the color coordination between the first color sample and the second color sample would be displayed in the device and the viewer can look at such color display through lens to simulate the actual color display in a space.

Figure 3D:
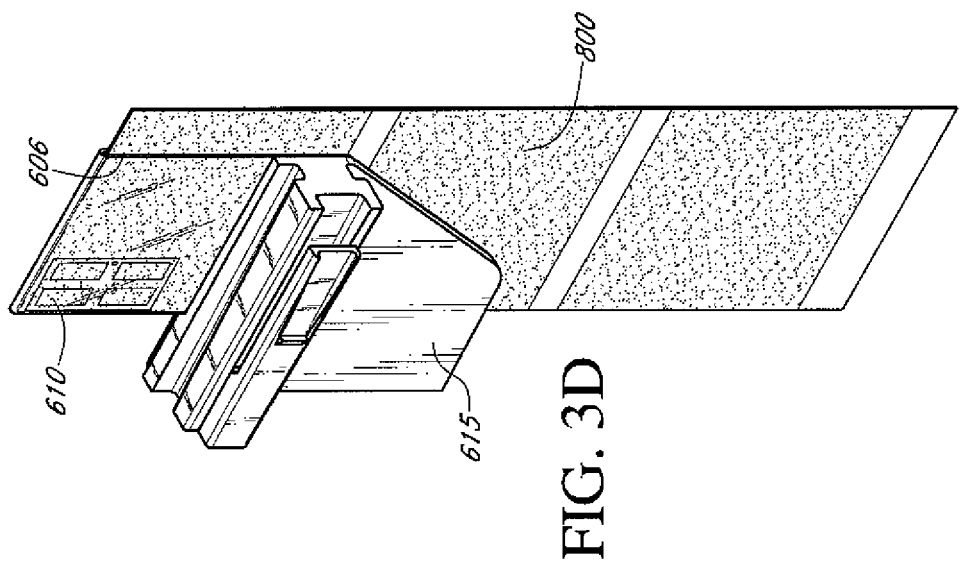
FIGS. 3C and 3D show enlarged views of a color cartridge of the device shown in FIGS. 1A and 1B.
Figure 3C:
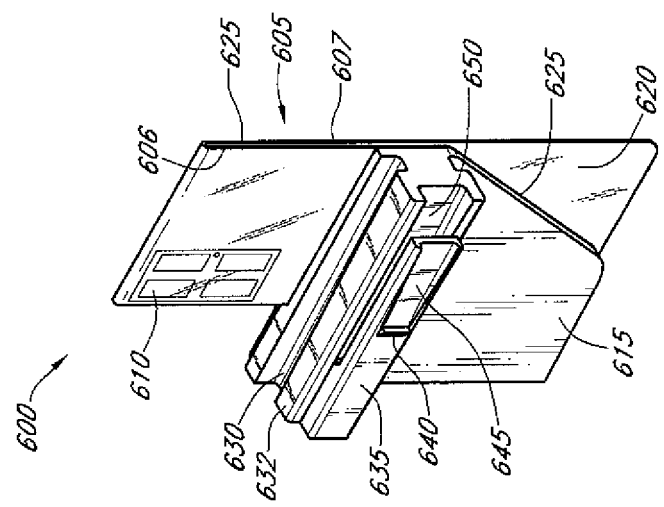

FIGS. 3C and 3D show enlarged views of the color cartridge 600. In various embodiments, the color cartridge 600 comprises a cassette 605. The cassette of the cartridge can be composed of two layers, a front cassette layer 606 and a rear cassette layer 607 and there is a slit 625 between these two layers. A second color sample is generally inserted between these two layers 606 and 607 through this slit 625. According to some embodiments, the cassette edges referenced 608 may be in a form of folded edge. Therefore, when the second color sample 800 is inserted into the cassette, the second color sample 800 would be pushed until it contacts these folded edges 608.

In various embodiments, the cassette is substantially transparent in order to show the second color sample 800 placed between the layers 606 and 607. The display window 610 is generally placed on the front cassette layer 606 and the second color sample 800 present in the cassette 605 can be considered to a color of the illustration present in the display window 610.

The cassette of the cartridge may further comprise a display window 610, which may comprise an illustration of a feature of a space. The feature may be any object that can be present in a space. Some non-limiting examples of the feature may include, but not limited to, a door, a window, a stair, a sink, a piece of furniture (e.g. a chair, a sofa, a table, a bed, and others), any appliance (e.g. a refrigerator, a television, and others), and any decorative objects (e.g. a light, a picture frame, a plant and others). Such features can further include any object present in an open space or an exterior of a building if the color display device is desired to be used for such space. Therefore, in such cases, the feature displayed in the cassette may comprise a plant, a sculpture, a car or any other objects that the viewer or user is willing to simulate in the device.

In one embodiment, the display window may be permanently placed, e.g. via printing, on the cassette. Therefore, in such an embodiment, a variety of cassettes may need to be used to display several different room features in the device. Accordingly, the cassette 605 can be designed to be easily replaced from the cartridge holder 600. In another embodiment, the display window 610 may be able to be placed temporarily on the cassette and removed from the cassette once the display is over. Such temporary displacement can be done, for example, by making a display window 610 in a form of sticky sheet. With this configuration, a variety of display window sheets, each of which illustrates different room features, can be used depending on the viewer's desire.

The color cartridge also comprises a base, which is further composed of a front base layer 606 and a rear base layer 607. There is also a slit 625 between these two layers of base and the second color sample 800 is generally entered into this slit 625.

Figure 4:
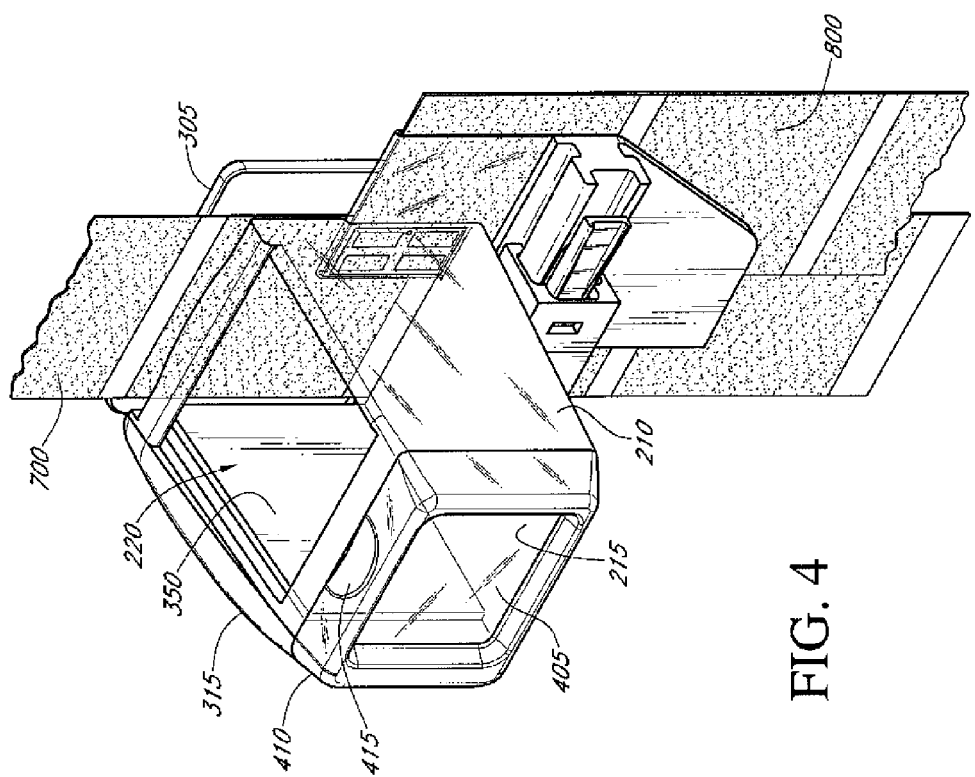
FIG. 4 shows the device of FIGS. 1A and 1B with the first and second colors samples.
Figure 5:
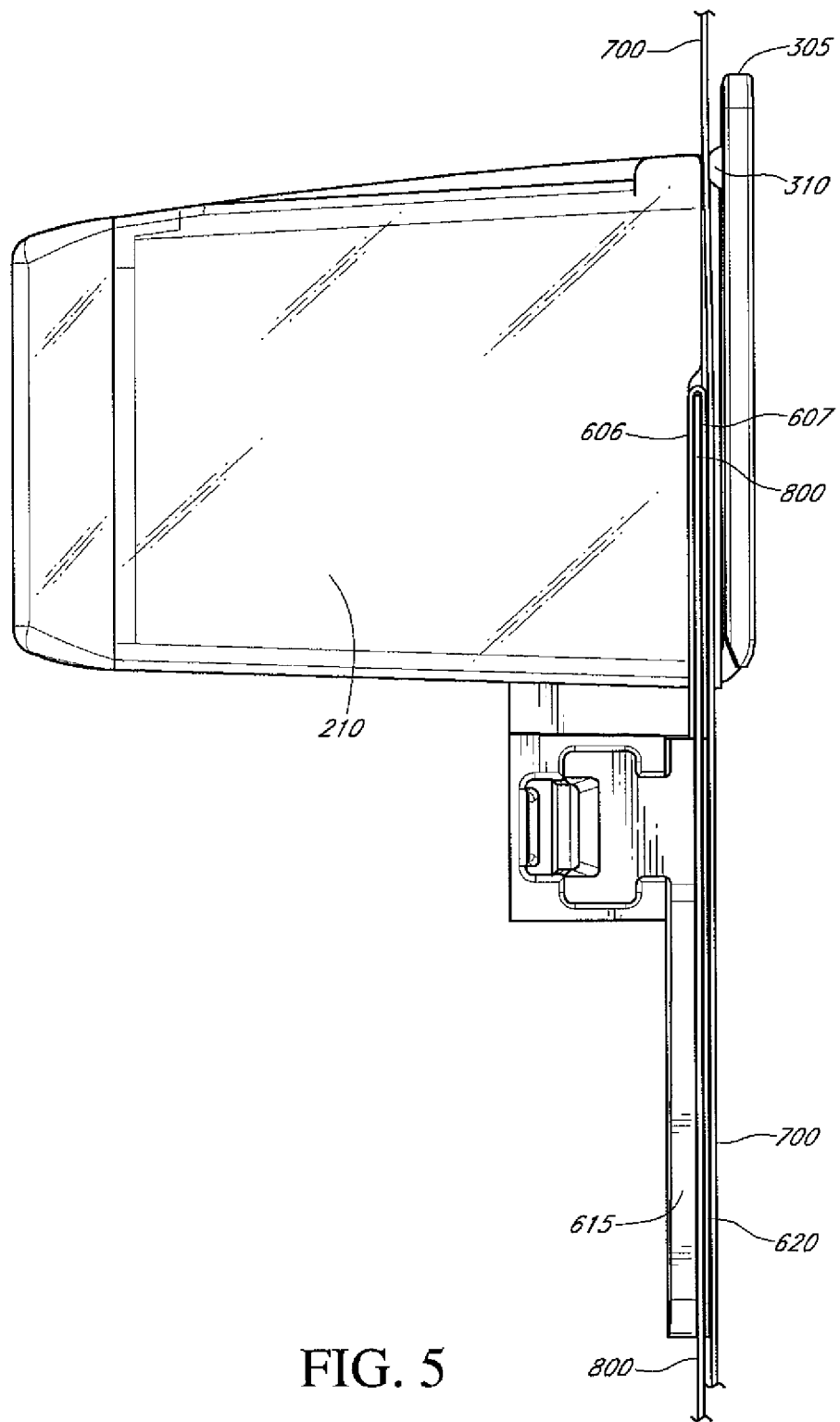
FIG. 5 shows a side view of the device in FIG. 4, particularly showing the placements of the first and second color samples.

FIGS. 4 and 5 show perspective views of the device when the first and second color samples are displayed. The order of device assembly and color display can be modified in many different ways. In general, the first color sample 700 is displayed on the first display panel 305, providing a background color. As described in FIGS. 3A and 3B, the first color sample can be inserted or slid into the device through the first opening 270. The second color sample can be displayed in the device, for example, via a color cartridge 600. The color cartridge 600 with the second color sample 800 as shown in FIG. 3D can be assembled with the cartridge receiver 500 via, for example, a snap-fit mechanism. During this assembly, the cassette 605 of the color cartridge 600 is inserted or slid into the second opening 360 and optionally the third opening 370. Once the device is fully assembled with the color samples, the viewer can look the color display image through the lens and further test other color combinations by changing the colors in each color sample 700 and 800. Generally the movement of the first color sample can be done along the vertical axis to change the colors displayed in the device. In some embodiments, the second color sample may not be moved along the vertical axis like the first color sample due to the folded, closed edges 608 of the cassette 605. In such embodiments, different colors can be still displayed by various ways. For example, the second color sample shown in FIG. 3D comprises three different colors (e.g. first, second and third colors) and these three colors are presented in a sequence. If the second color needs to be displayed, the viewer can simply fold the color sample to place the second color first. Then this folded color sample can be inserted into the cartridge to display the second color.

In some alternative embodiments, a plurality of color samples can be displayed in the device. To display multiple color samples, there may be a plurality of openings can be manufactured anywhere in the device. In one example, additional openings can be made in the floor area 215, a first side wall 205 and a second side wall 210. As described previously, if the viewer wishes to display two or more mock-up features (e.g. a sofa and a window), a second and a third color sample can be displayed in the device via a second or third openings. Furthermore, any of side walls 205 and 210 as well as window 220 can comprise additional color samples or materials for ceiling, if the viewer wishes to display different colors on these area. Therefore, there is no limitation in the number of color samples and their combinations displayed in the device and the viewer can try as many different simulations as he or she would like to perform.

In other alternative embodiments, a material representing a floor or ground can be displayed in the device. The floor 215 of the device is where generally a variety of materials for floor or ground can be displayed. In one embodiment, there is a replaceable floor material which is held in place (the floor 215) magnetically and later removed once the display is done. This is one embodiment but there are obviously numerous ways to install the floor or ground material into the device. It would be quite useful to be able to simulate different floor surfaces and these could be supplied or could just be done with other color samples. For example, a piece of laminate floor material, which can generally fit into the floor 215, can be provided into the device through window 220 or any possible openings present in the device. Then this floor material can simulate the actual image of a space along with one or more color samples in the device.

Figure 6:
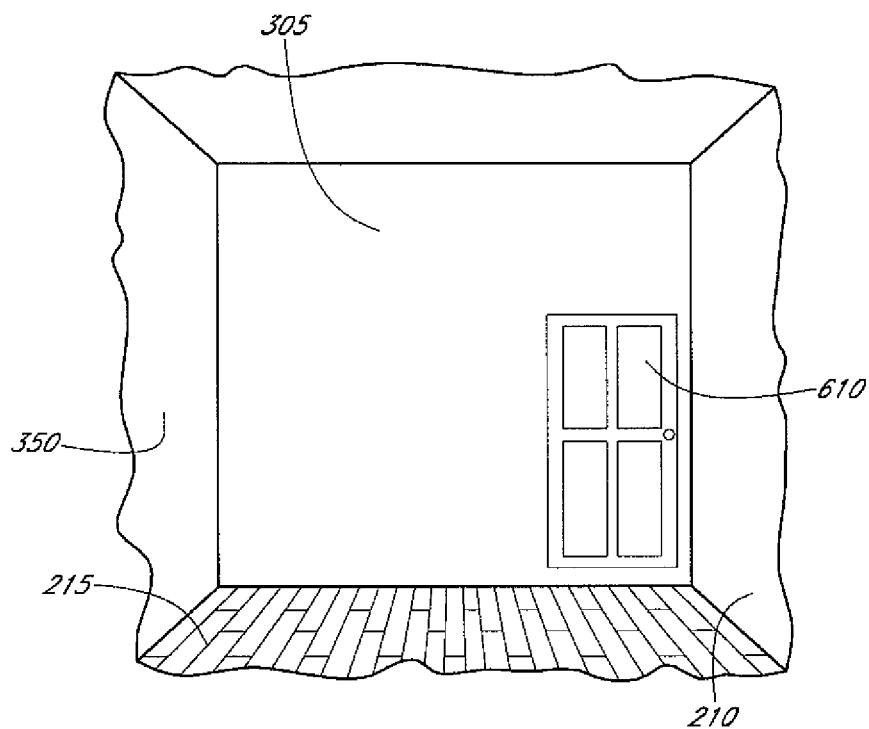
FIG. 6 shows a perspective view of the color display image viewed through a lens.

FIG. 6 shows a perspective view of the color display image viewed through a lens. When viewed through the lens 405, the color display image may comprise the first color sample 700 displayed on the first display panel 305, the second color sample 800 displayed in the display window 610 as well as the floor 215 at least in some examples. In some of such examples, the minor 350 can also be installed to reflect the first color sample 700 on the first side wall. This image of color display can provide some realistic sense to the viewer of how the actual space would look with the displayed colors and floor.

As noted throughout this specification, numerous changes can be made in the device as well as the displaying method of the present disclosure while the scope of the disclosure remains undisturbed. Therefore, any of such changes should also be considered to be included in the scope of the invention, in addition to the exemplary embodiments shown herein.

The present disclosure also provides a method of simulating color and/or floor material display in a space. According to some embodiments, the method of simulating color display in a space comprises: inserting the first color sample into the first opening and the second color sample into the second opening of the color display device and visualizing a color display image of the first and second color samples through the lens of the device. When displayed, the second color sample can be displayed in a way that it is overlaid on a portion of the first color sample.

According to some embodiments, the second or more color samples can be displayed in the device via the color cartridge. This cartridge then can provide the second color sample into the second opening. Some illustrative examples of how the second color sample can be presented into the device via the cartridge are disclosed in FIG. 4. The cartridge often comprises an illustration, which represent a mock-up feature of a space. The second color sample generally represents a color of this mock-up feature, thereby simulating the color coordination between this feature and the background room color of the actual space, at least in some examples.

As already described elsewhere in the specification, there can be a variety of modification in the color display method. For example, two or more color samples can be displayed in the device. Depending on the viewer's desire, a plurality of color samples, each of which may represent different mock-up feature of the space as well background colors, can be simultaneously displayed in the device. Furthermore, a floor material can be displayed along with the color samples if desired. This floor may include, but not be limited to, any indoor floor material as well as outdoor ground materials. Each color sample may comprise multiple colors and display these colors continuously in the device. The floor materials can also be easily replaceable, if desired. Further, light source directed to the device can also be changed. In one case, the ambient light of the actual space may be used with the device to provide more realistic simulation to the viewer. Alternatively, any other light sources, either natural or artificial, can also be used. Accordingly, with all possible modifications and alterations disclosed herein as well as others that can be done obviously, the number of combinations between the color samples and the floor materials simulated in the device are unlimited.

With the device and method described above, the viewer can select a desired color or a floor material for actual application to the space. This selection or determination process, according to some embodiments, comprises simulating a first color display with the first color sample and the second color sample with the color display device; simulating a second color display; and selecting a proper color or a floor material for the space. With the device of the present invention, the viewer can coordinate many different color samples and/or floor materials before actual application to the space. The viewer would try until he or she finds a desired or proper color and/or floor material. Such processes to select proper color and/or floor would need repeated processes of displaying various color samples and floor materials in the device. However, these processes can be done relatively easily and efficiently with the device and methods according to this application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device for displaying samples comprising:
   a first display panel;
   a first opening in or on the first display panel for a first color sample, said first color sample providing a background color;
   a second opening for a second color sample, said second opening configured to overlay said second color sample on a portion of the first color sample, said portion comprising a transparent representation of an object such that said object appears to be the color of said second color sample;
   a viewing opening set apart from the first display panel such that a viewer looking through the viewing opening can view an image of the first display panel comprising the first color sample and the second color sample while said second color sample is overlaying the first color sample; and
   a substantially open or transparent surface such that light can enter the device through said surface.

2. A device according to claim 1, wherein the device is sized and shaped to be held in a hand and/or portable.

3. A device according to claim 1, wherein the first color sample is configured to be inserted into the first opening and placed on or in the first display panel.

4. A device according to claim 1, wherein the first color sample comprises a plurality of colors.

5. A device according to claim 4, wherein the device is configured to continuously display the plurality of colors present in the first color sample.

6. A device according to claim 1, wherein the first opening is placed on the first display panel so that the first color sample is positioned on the first display panel.

7. A device according to claim 1, wherein the viewing opening comprises a lens adapted to provide a focused image of the first display panel to the viewer.

8. A device according to claim 7, wherein the lens is configured to be adjusted from the first display panel in distance so that the viewer can obtain a focused image of the first display panel.

9. A device according to claim 7, wherein the lens comprises a portion of magnifying lens.

10. A device according to claim 7, wherein the lens is configured to be replaced with another lens.

11. A device according to claim 1, wherein the second color sample is inserted into a first cartridge and the first cartridge is configured to be inserted into the second opening.

12. A device according to claim 11, wherein the first cartridge comprises a cassette and the second color sample is inserted into the cassette through a slit present in the cassette.

13. A device according to claim 12, wherein the cassette is substantially transparent.

14. A device according to claim 12, wherein the cassette comprises an illustration of an object, said object representing a mock-up feature of a space.

15. A device according to claim 12, wherein the cassette is configured to be replaced with another cassette from the first cartridge.

16. A device according to claim 1, wherein the device further comprises a plurality of openings and additional color samples or cartridges are configured to be inserted into said plurality of openings.

17. A device according to claim 1, wherein the device further comprises a second display panel for displaying a floor material sample.

18. A device according to claim 1, the device further comprises a mirror.

19. A device according to claim 1, wherein the device further comprises a light source, said light source being configured to be present in or on the device permanently or temporarily.

20. A device according to claim 1, wherein the transparent representation comprises a line drawing.

21. A method of simulating a display in a space, wherein the method comprises:
   inserting a first color sample into a first opening of a portable device for displaying samples such that said first color sample appears in a first display panel of said device so as to provide a background color;
   inserting a second color sample into a second opening of the device so as to overlay the second color sample on a portion of the first color sample, said portion comprising a transparent representation of an object such that said object appears to be the color of said second color sample;
   providing light to the device through an open or transparent surface of the device; and
   while holding the device in a hand, looking through a viewing opening of the device to visualize a color display image comprising the first and second color samples.

22. A method according to claim 21, wherein the color display is visualized through a lens present on the viewing opening, said lens adapted to provide a focused image of the first display panel to the viewer.

23. A method according to claim 21, wherein the second color sample is inserted into a first cartridge and the first cartridge is configured to overlay the second color sample on the portion of the first color sample.

24. A method according to claim 23, wherein the first cartridge comprises the line drawing of the object, said object representing a mock-up feature of a space.

25. A method according to claim 21, wherein the method further comprises:
  displaying a floor material on a second display panel of the device.

26. A method according to claim 22, wherein said visualizing further comprises:
  bringing the color display image into focus by adjusting the distance of the viewing opening to the first display panel; and
  looking at a focused image of the color display image through the viewing opening.

27. A method according to claim 21, wherein the light is ambient light of the space.

28. A method according to claim 21, wherein the method further comprises:
  displaying additional color sample(s) and/or additional floor material sample(s) in the device.

29. A method according to claim 21, wherein the method further comprise:
  removing the first or second color sample from the device; and
  inserting a third color sample into the first or second opening of the device.

30. A method of determining a color or a floor material for a space, the method comprising:
  simulating a first color display comprising the first color sample and the second color sample according to claim 21;
  simulating a second color display; and
  selecting a proper color for the space.

31. A method according to claim 30, wherein said simulating the second color display further comprise:
  changing the first color sample with a third color sample; and
  visualizing the second color display image comprising the second and third color samples through the viewing opening of the device.

32. A method according to claim 30, wherein said simulating the second color display further comprise:
  changing the second color sample with a third color sample; and
  visualizing the second color display image comprising the first and third color samples through the viewing opening of the device.

33. A method according to claim 30, wherein the method further comprise:
  displaying a first floor material in the device; and
  simulating the first color display or the second color display with the first floor material.

34. A method according to claim 33, wherein the method further comprises:
  changing the first floor material sample with a second floor material sample; and
  selecting a proper floor material for the space.

35. A method according to claim 21, wherein said light is an ambient light of a location in which said color image is supposed to be applied.

36. A method according to claim 21, wherein the method further comprises:
  placing the device in a location in which said color image is supposed to be applied.

37. A method according to claim 21, wherein the transparent representation comprises a line drawing.

\* \* \* \* \*

UNITED STATES PATENT AND TRADEMARK OFFICE
CERTIFICATE OF CORRECTION

PATENT NO. : 8,678,825 B2
APPLICATION NO. : 13/139491
DATED : March 25, 2014
INVENTOR(S) : Paul Mutimear It is certified that error appears in the above-identified patent and that said Letters Patent is hereby corrected as shown below:

In the Specification

Column 14, Line 31, change "minor" to --mirror--.

Signed and Sealed this
Eighteenth Day of November, 2014

Michelle K. Lee
*Deputy Director of the United States Patent and Trademark Office*